United States Patent [19]

Mendoza

[11] Patent Number: 4,711,164
[45] Date of Patent: Dec. 8, 1987

[54] OVEN FOR PREPARING FRIED FOOD PRODUCTS

[76] Inventor: Fausto C. Mendoza, Calzada San Esteban Num 57, Naucalpan de Juarez, Mexico

[21] Appl. No.: 834,400

[22] Filed: Feb. 27, 1986

[30] Foreign Application Priority Data

Apr. 19, 1985 [MX] Mexico ................................. 205.029

[51] Int. Cl.$^4$ ............................................... A21B 1/42
[52] U.S. Cl. ....................................... 99/339; 99/352; 99/443 C
[58] Field of Search ................. 99/443 C, 443 R, 355, 99/352, 395, 397, 331; 426/523

[56] References Cited

U.S. PATENT DOCUMENTS

| 2,112,309 | 3/1938 | Santillan | 99/355 X |
| 3,993,788 | 11/1976 | Longenecker | 426/523 X |
| 4,554,437 | 11/1985 | Wagner et al. | 99/443 C |

Primary Examiner—Timothy F. Simone
Attorney, Agent, or Firm—Jeffers, Hoffman & Niewyk

[57] ABSTRACT

An improved oven for preparing fried products includes a frame structure across which several transport belts traverse and carry product through a series of sets of burners disposed at different zones or levels of the oven. The sets of burners operate in accordance with known principles of convective flow of heat to produce different temperatures at different levels and in such a sequence that on entering the oven the product is subjected to a high temperature that then progressively diminishes as the product is carried through the different levels of the oven until it finally exits therefrom.

5 Claims, 4 Drawing Figures

OVEN FOR PREPARING FRIED FOOD PRODUCTS

BACKGROUND OF THE INVENTION

1. Field of the Invention

The present invention generally relates to preparation of fried products and, more particularly, is concerned with an oven having different levels operating at different temperatures with the product being subjected to the different temperatures by using a series of belts to transport it through the different levels of the oven.

2. Description of the Prior Art

There are diverse food preparation processes being used at the present time with the objective of obtaining fried products having an enhanced quality that will satisfy the tastes of the consuming public. This quality demands that the product be well structured so that it can be handled without breaking, but, at the same time, be sufficiently crispy so that upon being eaten it is smooth and agreeable to the palate.

Unfortunately, these demands are often in conflict with one another. For instance, in order to make the product be crispy, a stone crushed dough is frequently used. This dough contains solid particles having a dimension of 30 to 40 meshes by 2.54 cm, as compared to the more commonly used dough whose solid particles are much smaller, being in the dimensional range of 100 to 120 meshes by 2.54. The dough having the larger size solid particles results in a deficient product that, although crispy, is fractured on handling and has a palatability spoiled by the sensation of coarse thickness upon eating it.

Also, a system is used to make dough by adding mechanical yeast that upon cooking the product generates carbonic gas. Upon escaping from the product, the gas forms pores and gives crispiness to the product but leaves it without the necessary consistency to handle it without breaking. It also changes the flavor unfavorably.

Consequently, a need exists for a fried food preparation technique which will address the structure, crispiness and palatability of the fried product in a manner which does not improve one at the sacrifice of the other.

SUMMARY OF THE INVENTION

The present invention provides an improved oven to prepare fried food products which is designed to satisfy the aforementioned needs. The improved oven of the present invention produces excellent fried products, with any dough and without the need for precooking, which are near perfectly structured so that they do not break during handling and that are nevertheless excellently palatable on being eaten. The improved oven is designed to operate simultaneously with different temperatures at different zones or levels in the oven, such as produced in accordance with known principles of convective flow of heat, and to provide means for sequentially subjecting the product to the different temperatures by transporting it through the different levels. Preferably, when cooking is initiated at the highest level of the oven, the product is subjected to a high temperature, for instance in the range of about 500 to 600 degrees C, whereby a violent evaporation is produced that opens the pores of the product. Then, as the product moves through successively lower levels of the oven the temperature experienced is gradually diminished to approximately 150 degrees C at the exit from the oven. With this technique, by using any dough a product is achieved with good consistency for handling and with excellent palatability.

Accordingly, the present invention is directed to an improved oven for preparing fried products, comprising: (a) a frame structure; (b) a plurality of sets of burners disposed at different levels of the frame structure, the sets of burners being operable to produce different temperatures at the different levels of the frame structure; and (c) a plurality of transport belts mounted across the structure and being operable to traverse the structure and carry product along a serpentine path through the sets of burners at the different levels.

More particularly, the belts are disposed about and extend between pairs of rollers mounted on the structure at the different levels thereof. Each of the belts has an upper run and a lower run. The lower and upper runs of some of the belts are disposed closely adjacent respective upper and lower runs of others of the belts and have means thereon which form hollow chambers between the adjacent runs of separate belts and adjacent given ones of the sets of burners at respective ones of the levels of the frame structure which chambers by themselves constitute mini-ovens at the respective levels.

Still further, the sets of burners are operable at different temperatures in such a sequence that upon entering the oven the product is subjected to the set of the burners producing the highest temperature level in the oven. Thereafter, the temperature level progressively diminishes as the product is carried through the different levels of the frame structure until the temperature reaches its lowest level as the product finally exits from the oven. The initial temperature level upon entering the oven is preferably three or more times greater than the final temperature upon exiting the oven. By way of example, the initial temperature level is approximately 600 degrees C. and the final temperature is approximately 150 degrees C.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
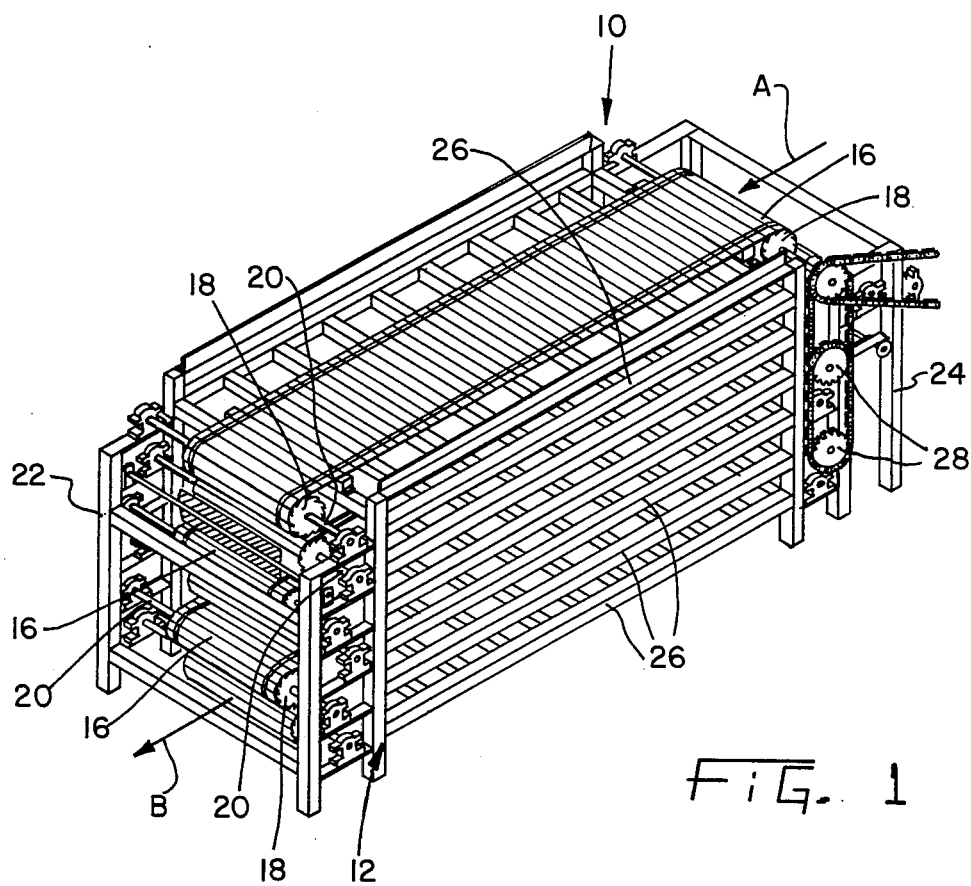
FIG. 1 is a perspective view of the improved oven of the present invention.
Figure 2:
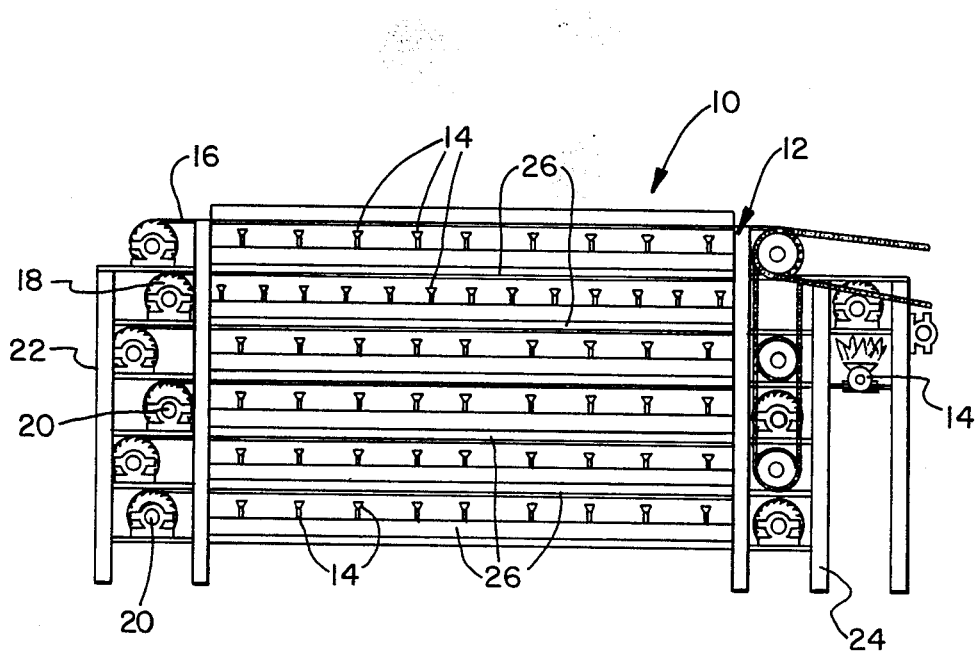
FIG. 2 is a side elevational view of the improved oven of FIG. 1.
Figure 3:
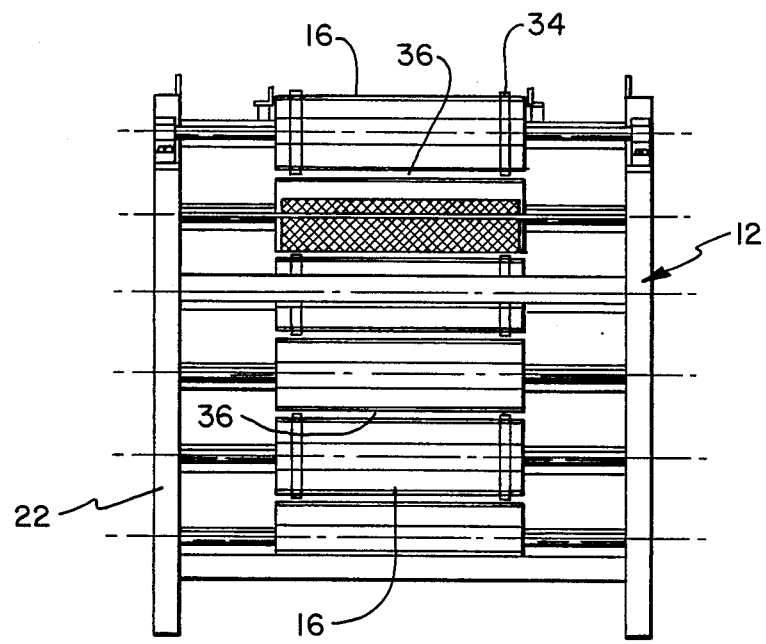
FIG. 3 is an end elevational view of the improved oven of FIG. 1, on a slightly larger scale.

Referring now to the drawings, and particularly to FIGS. 1 to 3, there is shown an improved oven for preparing fried food products, being generally designated by the numeral 10 and constituting the preferred embodiment of the present invention.

In its basic components, the improved oven 10 includes a frame structure 12, a plurality of sets of burners 14 disposed at different levels of the frame structure 12, and a plurality of transport belts 16 mounted about and extending between pairs of rollers 18 being supported on respective shafts 20 rotatably mounted on opposite ends 22,24 of the frame structure 12 at the different levels thereof. The different sets of the burners 14 are supported on respective ones of a series of vertically spaced open horizontal partitions 26 which extend between and rigidly interconnect with the opposite ends 22,24 of the frame structure 12. The sets of burners 14 are operable, such as in accordance with known principles of convective flow of heat, to produce different temperatures at the different levels of the frame structure 12 defined by the open partitions 26.

From above, it will be understood that the transport belts 16 are mounted by the rollers 18 to extend across the frame structure 12. Upon operation of a suitable power drive source (not shown) coupled to the drive train of the belts, being generally identified by numeral 28, the belts are operable to horizontally traverse the frame structure 12 and cause a product to travel along a serpentine path through the sets of burners 14 at the different levels.

Figure 4:
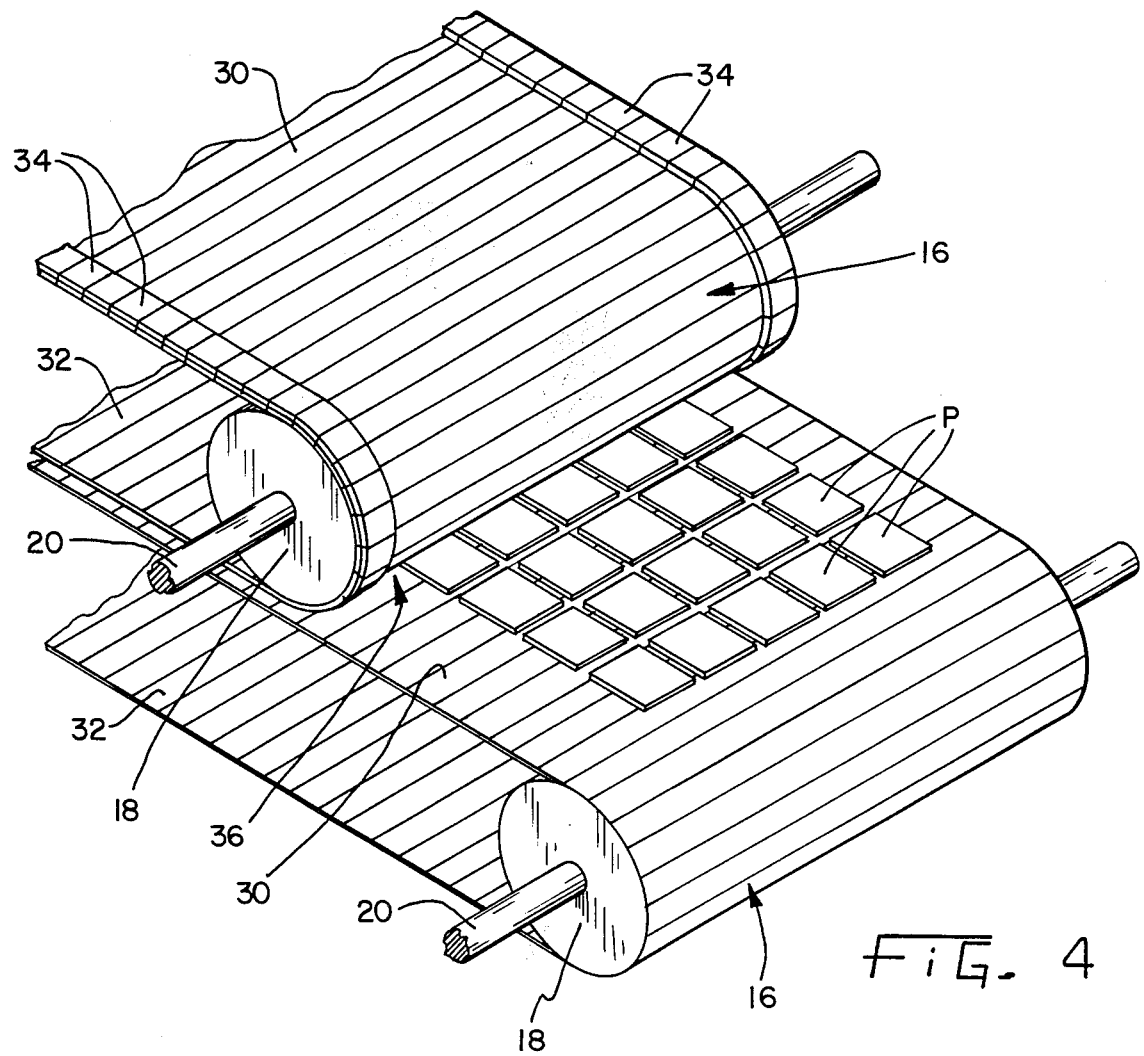
FIG. 4 is an enlarged fragmentary view of the rollers and belts located at the entrance of the improved oven of FIG. 1 with the product being shown thereon.

More particularly, as seen in FIG. 4, each of the belts 16 has an upper run 30 and a lower run 32. Being representative of other combinations of the belts 16 in the oven 10, as seen in FIG. 4 the lower run 32 of the upper belt 16 is disposed closely adjacent the respective upper run 30 of the lower belt 14 and has means in the form of raised separator elements 34 arranged end-to-end thereon along opposite edges of the upper belt on the outer side thereof. The respective lower and upper runs 32,30 of the upper and lower belts 16 together with the separator elements 34 form a hollow chamber 36 between the adjacent runs of separate belts which, by being adjacent a given one of the sets of burners 14, in and of itself constitutes a mini-oven at the respective temperature level of the oven 10.

As mentioned above, the different sets of the burners 14 at the different levels of the frame structure 12 are operable at different temperatures, at such different levels in accordance with known principles of convective flow of heat. In particular, the different temperature levels produced by the sets of burners 14 are preferably in such a sequence that upon entering the oven 10 at the location of the arrow A in FIG. 1, the product P (seen only in FIG. 4) is subjected to the burner set producing the highest temperature level in the oven 10. Thereafter, the temperature level progressively diminishes as the product is carried along the serpentine path down through the different levels of the frame structure 12 until the temperature reaches its lowest level as the product P finally exits from the oven 10 at the location of the arrow B. Preferably, the initial temperature level upon entering the oven 10 is three or more times greater than the final temperature upon exiting the oven. For example, the initial temperature level is preferably approximately 600 degrees C., whereas the final temperature is preferably approximately 150 degrees C. By way of example, at the uppermost level of the oven 10, the operating temperature range might be 500 to 600 degrees C., the next uppermost operating temperature range might be 500 to 400 degrees C., the next lowermost operating temperature range might be 400 to 300 degrees C., and finally the lowermost operating temperature range might be 300 to 150 degrees C. It is readily apparent that these particular temperature ranges are exemplary only, since the oven functions with the range of temperatures that is most convenient.

By cooking the product P with these ranges of temperatures, the desired effect is achieved of providing porousness due to the violence of the evaporation in the initial level with the temperature of 500 to 600 degrees C., while avoiding burning of the product in the later levels where the temperature is reduced until reaching 150 degrees C.

Although any type of dough can be used, it has been seen that optimum results are obtained with a dough prepared with an emulsion of fat and water.

Although not illustrated, sheets or meshes are provided in order to pick up the product at the lower exit of the oven 10.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

I claim:

1. An improved oven for preparing fried products, comprising:
   (a) a frame structure;
   (b) a plurality of sets of burners disposed at different levels of said structure, said sets of burners being operable to produce different temperatures at said different levels of said structure; and
   (c) a plurality of transport belts mounted across said structure and being operable to traverse said structure and carry product along a serpentine path through said sets of burners at said different levels, each of said belts having an upper run and a lower run, said lower and upper runs of some of said belts being disposed closely adjacent respective upper and lower runs of others of said belts and having laterally spaced apart raised separator elements thereon which form elongated hollow chambers between said adjacent runs of separate belts and adjacent given ones of said sets of burners at respective ones of said levels of said structure which chambers by themselves constitute mini-ovens at said respective levels.

2. The improved oven as recited in claim 1, wherein said belts are disposed about an extend between pairs of rollers mounted on said structure at said different levels thereof.

3. The improved oven as recited in claim 1, wherein said sets of burners are operable at different temperatures and in such a sequence that upon entering said oven the product is subjected to the set of said burners producing the highest temperature level in said oven and thereafter the temperature level progressively diminishes as the product is carried through said different levels of said structure until the temperature reaches its lowest level as the product finally exits from said oven.

4. The improved oven as recited in claim 3, wherein the initial temperature level upon entering said oven is three or more times greater than said final temperature upon exiting said oven.

5. The improved over as recited in claim 4, wherein said initial temperature level is approximately 600 degrees C. and said final temperature is approximately 150 degrees C.

* * * * *

UNITED STATES PATENT AND TRADEMARK OFFICE
CERTIFICATE OF CORRECTION

PATENT NO.   : 4,711,164

DATED        : December 8, 1987

INVENTOR(S)  : Fausto Celorio Mendoza

It is certified that error appears in the above-identified patent and that said Letters Patent is hereby corrected as shown below:

On the Title Page, Item [76]

Change the inventor's name "Fausto C. Mendoza" to
--Fausto Celorio Mendoza--.

Signed and Sealed this

Seventeenth Day of May, 1988

Attest:

DONALD J. QUIGG

*Attesting Officer*      *Commissioner of Patents and Trademarks*